(No Model.)
L. P. TRUE.
CAN.
No. 490,418. Patented Jan. 24, 1893.
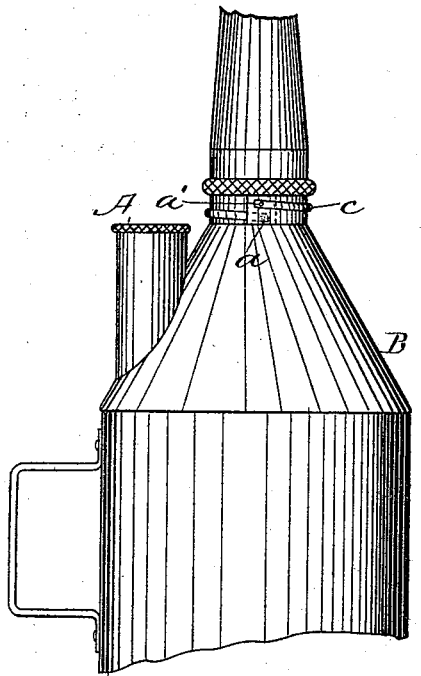
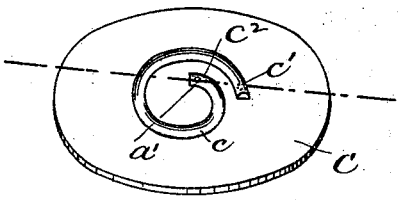
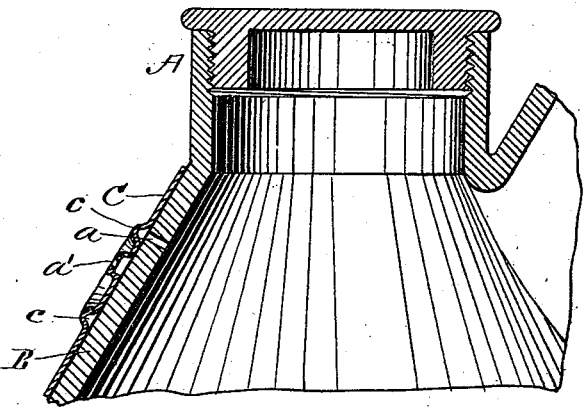
WITNESSES.
Frank G. Parker
Eva Guild
INVENTOR.
Laforest P. True

UNITED STATES PATENT OFFICE.

LAFOREST P. TRUE, OF CLINTON, MAINE.

CAN.

SPECIFICATION forming part of Letters Patent No. 490,418, dated January 24, 1893.

Application filed March 23, 1892. Serial No. 426,163. (No model.)

*To all whom it may concern:*

Be it known that I, LAFOREST P. TRUE, of Clinton, in the county of Kennebec and State of Maine, have invented a new and useful Improvement in Cans, applicable more particularly to oil-cans, of which the following is a specification.

My invention relates to that class of cans in which an air vent is provided to allow the air to pass into the can as the liquid is poured out. In all such cans made previous to my invention so far as I know, the air passage has always been straight and the outer end of it has of necessity, ended in a well or nozzle from which the liquid is poured, it being necessary in such cases to provide some means whereby the liquid which will leak out through a straight air vent, can flow back into the can again, and also to provide means for closing the air vent against leakage in case the can be upset.

My invention consists in providing a can with an air passage of peculiar shape whereby this trouble is prevented, the shape being such that in the ordinary use of the can, it is practically impossible for liquid to leak out through the air passage. This is due not to the position of the passage in the walls of the can, for my passage may be placed anywhere above the normal liquid line and the outer end of it need not terminate in the pouring out passage, but to the fact that the passage is made in a helical or spiral shape and of sufficient length for the ends to overlap so that if a drop of liquid passes into one end of the passage, it must travel more than once round the pole or center of the curve in which the passage is shaped before it can escape from the other end.

I prefer to form my improved form of air passage by making an indentation in a piece of tin and applying it to the outside of the can in the way to be described.

My invention will be fully understood from the drawings in which

Figures 1 and 2 show different forms of can embodying my improvement; Fig. 3 shows in perspective one form of plate to be attached to the cap or other part of a can in carrying out my improvement; Fig. 4 is a portion of an oiler to which my invention is applied, Fig. 5 being a plate used in the construction shown in Fig. 4.

In all of the views A is the cap and B are the walls of the can.

C is a plate of tin or other suitable material in which is made an indentation $c$. This indentation may be either helical as shown in Fig. 3, or it may be of the shape shown in Fig. 5, in which latter case the plate is of sufficient length and is intended to be so wrapped round some portion of the can as to form a curved passage of the required shape in which the ends overlap or pass. This passage is connected with the interior of the can by a slight perforation $a$ under the end $c'$ of the passage. The other end $c^2$ of the passage is provided with a similar perforation $a'$ extending outwardly through the plate C so as to connect the passage with the open air.

The simplest way to apply my improvement is to make a perforation $a$ in a suitable part of the can and then having made the indentation $c$ in the plate C with the perforation $a'$ in its end $c^2$, to solder the piece C on to the can so that the blind end $c'$ of the passage $c$ may be over the perforation $a$. It will be understood however, that the shape of the indentation and of the plate C will depend upon the part of the can to which the air passage is to be applied, the essential feature of the invention being the passage curved as described, the ends of which overlap or pass.

My device is simple in construction, and owing to the shape of the air passage, it will be seen that it is practically impossible for any liquid to leak from it, for which reason it does not need to be provided with any stopper, nor is there any necessity for its outer end to be connected in any way with the well or filling nozzle of the can.

I am aware that cans have been heretofore provided with air passages, but so far as I know, such passages have always been straight, and hence have been liable to leak if the can were overturned. The can above described as of my invention cannot leak under any of the ordinary conditions of use owing to the peculiar shape of the passage which it contains.

What I claim as my invention is,

The can above described having an air passage in one of its walls connecting the interior of the can with the atmosphere, said passage being curved as described and the ends of said passage overlapping, all as and for the purposes set forth.

In testimony whereof I have hereunto subscribed my name this 18th day of March, 1892.

LAFOREST P. TRUE.

Witnesses:
GEORGE O. G. COALE,
JOSEPH DESMOND.